United States Patent [19]

Orschek et al.

[11] Patent Number: 5,392,716
[45] Date of Patent: Feb. 28, 1995

[54] LOCOMOTIVE TRACTION MOTOR CONTROL SYSTEM

[75] Inventors: Edward J. Orschek, North East; Myron L. Smith, Fairview; Dale C. Walker, Erie, all of Pa.

[73] Assignee: General Electric Company, Erie, Pa.

[21] Appl. No.: 98,695

[22] Filed: Jul. 28, 1993

[51] Int. Cl.⁶ ............................................. B61C 3/00
[52] U.S. Cl. ...................................... 105/61; 105/49; 374/153
[58] Field of Search .................... 105/61, 54, 136, 137, 105/49; 374/121, 120, 153, 141, 178, 183, 185

[56] References Cited

U.S. PATENT DOCUMENTS

| | | | |
|---|---|---|---|
| 2,961,875 | 11/1960 | Reumund | 374/153 |
| 4,340,886 | 7/1982 | Boldt et al. | 374/153 |
| 5,145,322 | 9/1992 | Senior et al. | 374/153 |

Primary Examiner—Mark T. Le
Attorney, Agent, or Firm—Jill M. Breedlove; Marvin Snyder

[57] ABSTRACT

A locomotive traction motor control system includes a traction motor suspended by traction motor suspension bearings, such as roller bearings in a bearing assembly, and traction motor suspension bearing temperature sensors, such as thermistors, for sensing a temperature of the traction motor suspension bearings. A controller, such a microprocessor based controller, receives a hot bearing indication from a hot bearing detection unit (HBDU) connected to the suspension bearing temperature sensors. The controller generates a warning indication based on the temperature sensed by the suspension bearing temperature sensors when the HBDU detects an improper bearing temperature. The control system also facilitates detection and warning of an improper stretch braking condition and subsequently limits current to the traction motors in response to detecting the improper stretch braking condition.

5 Claims, 9 Drawing Sheets

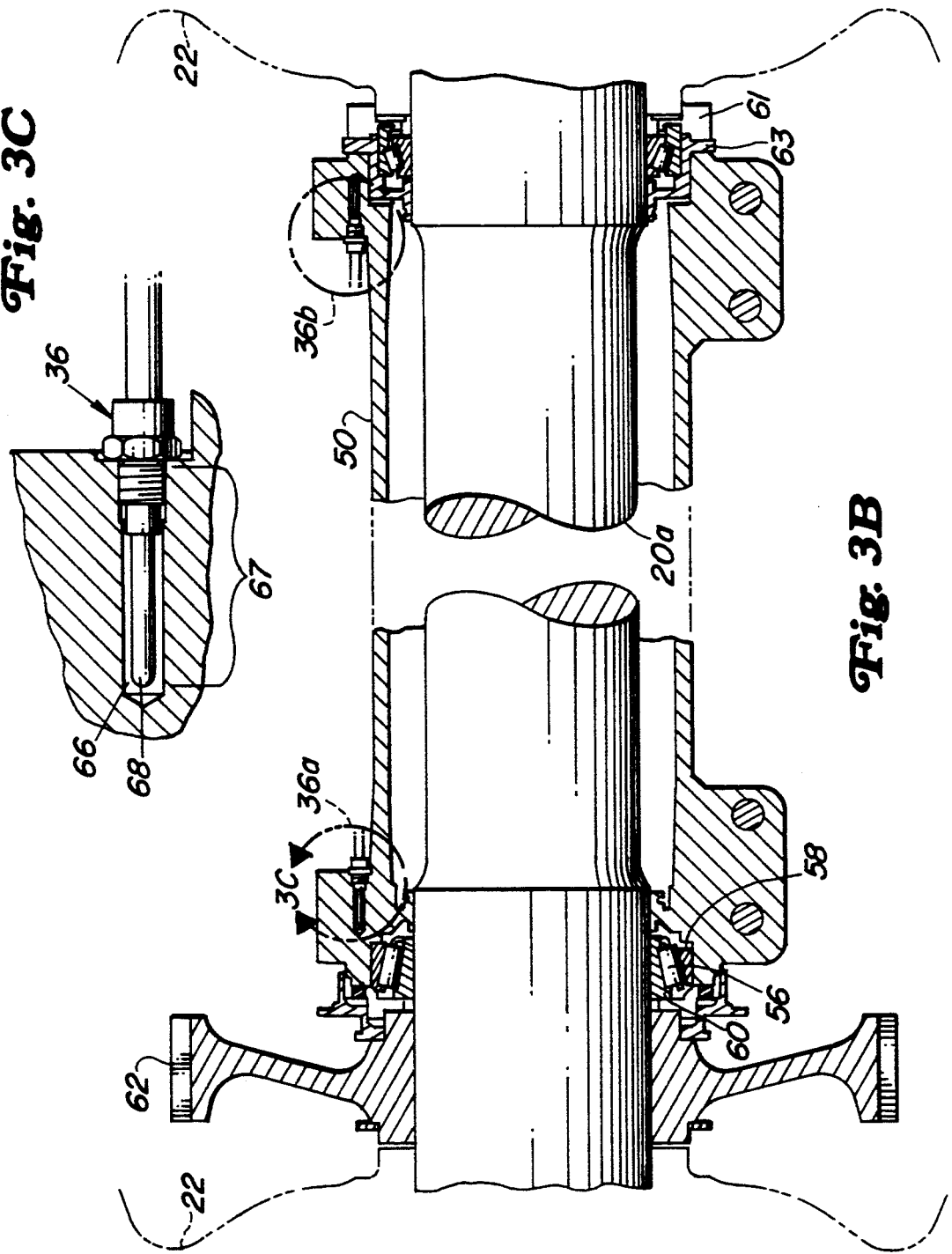

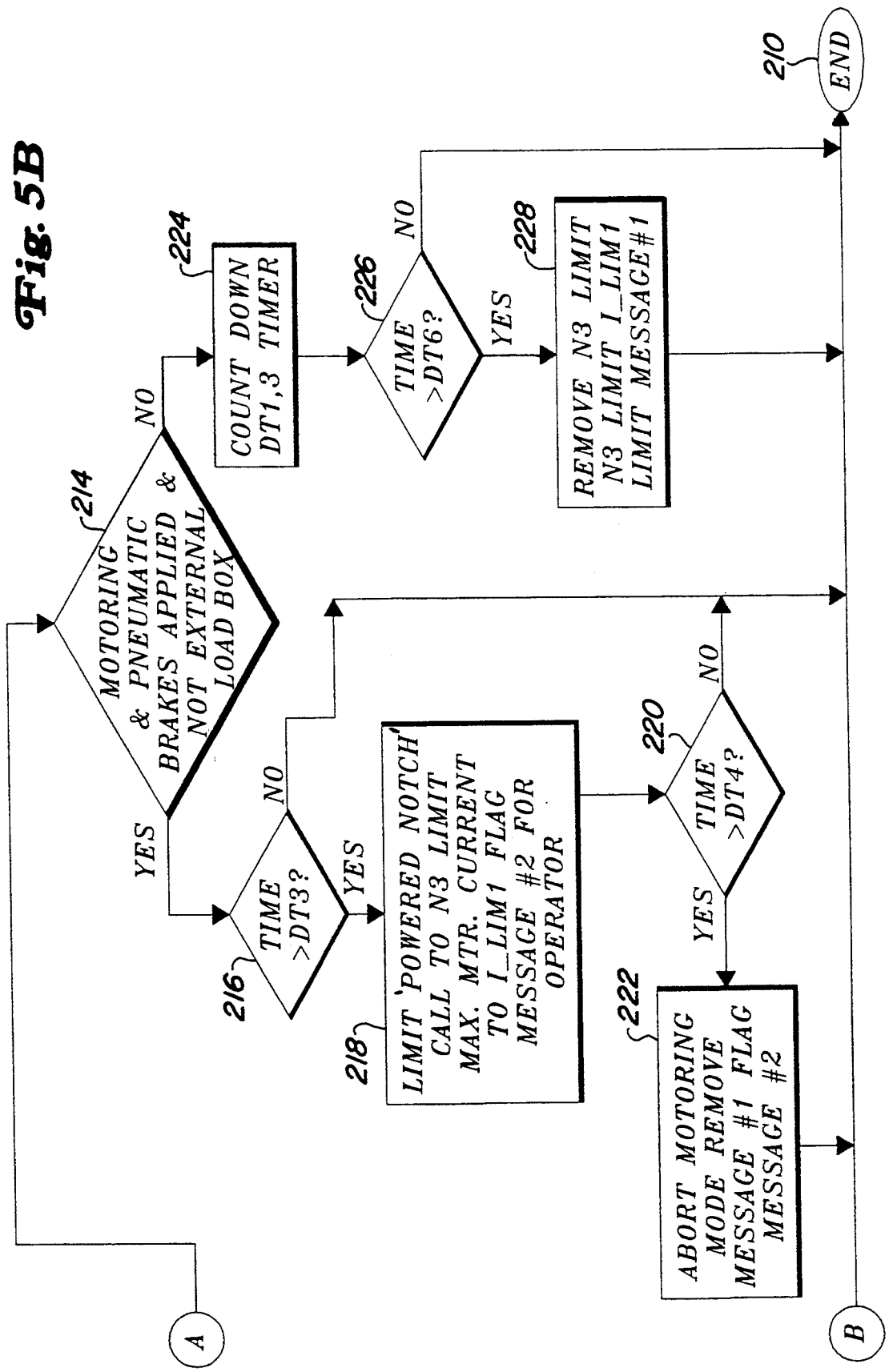

५,३९२,७१६

LOCOMOTIVE TRACTION MOTOR CONTROL SYSTEM

BACKGROUND OF THE INVENTION

The invention relates generally to traction motor control systems, and relates more particularly to locomotive traction motor suspension and current control systems.

Traction motors for locomotives are typically coupled to drive gears for each respective axle of the locomotive. The amount of current to the traction motors is controlled so that proper propulsion may be carried out depending upon loading conditions of the engine. Axle mounted traction motors are typically connected to and suspended from their respective axle such that a plain end is connected to a portion of the truck and another portion of the traction motor is coupled about the moving axle through a "U-Tube" as known in the art. A problem arises with locomotive traction motors when the traction motor suspension bearings overheat.

In general, typical traction motor suspension bearing configurations include an inner angled roller bearing secured between an inner cone which is proximate the axle and an outer cup. The cup and cone allow rotation of the roller bearing. A suspension bearing housing encloses the cup, roller bearing and cone configuration and protects the bearing assembly from external elements. The suspension bearing housing is typically a "U-Tube" and extends circumferentially one half the way around the axle. The traction motor is supported on its one end by the "U-Tube" and bearing connection, and is supported to a fixed support on the truck at its other end.

The traction motor suspension bearings may overheat for a variety of reasons including lack of bearing lubricant, a cracked bearing housing, or other fault caused by various stress loading. The overheating of the traction motor suspension bearings may cause a locked axle or cause the traction motor to be separated from its mounting structure. This may result in the cutting or locking of the axle causing a derailment. Consequently, there exists a need for a hot bearing detection system for locomotive traction motors.

Generally, hot bearing detection is known for axle bearings on locomotives. Such hot axle bearing detection may be facilitated by a wayside heat detection unit that detects the overheating of an axle bearing as the locomotive travels down the tracks. For example, a wayside infrared energy detecting sensor detects hot axle bearing as the train travels along the tracks. The infrared detection sensor may be placed on the outside of a track and be coupled to a railroad tie so that the sensor points vertically to detect the overhanging or outboard axle bearing. Such wayside sensing units are used along railways to detect the overheating of axle bearing to avoid derailments or other serious malfunctions caused by axle bearing overheating.

When axle bearings are located between wheels of a locomotive, e.g., inboard axle bearings, a hot bearing sensor is typically placed proximate to the inboard axle bearing to detect the temperature of the axle bearing to avoid overheating as previously discussed. A communication link among coupled rolling stock is toggled to indicate that a hot axle has been detected. However, such mechanisms are not generally known for traction motor bearings.

Another problem with traditional tractor motor control systems, is that they typically fail to adequately protect brake life and traction motor life. Traction motors receive their drive current from an alternator which is typically driven by a diesel engine. A computer typically controls the amount of drive current to the traction motors. Locomotive operators often attempt to maintain a tight linkage between rolling stock such as cars in the train while stopping or traveling along tracks to minimize jerking. For example, when locomotives and cars are traveling over mountainous terrain, the operator attempts to manually control the locomotive so as to maintain a tight linkage among the cars. Such manual control is accomplished by applying the power brake when the locomotive is in motoring. Such control is termed stretch braking. Motoring is a term to indicate that the locomotive is being asked to apply alternator power to the traction motors. However, a problem arises during stretch breaking when the operator applies power braking for an extended period. As a consequence, the traction motors may experience excessive overheating, and the power brakes will experience excessive wear.

SUMMARY OF THE INVENTION

Accordingly it is a general object of the present invention to provide a traction motor control system that substantially overcomes the above mentioned problems.

It is an object of the present invention to provide a traction motor control system having hot bearing detectors for the traction motor suspension bearings.

It is a further object of the present invention to provide a traction motor control system having a controller for monitoring suspension bearing temperature sensors and warning an operator of an over temperature condition.

It is a further object of the invention to provide a traction motor control system which is capable of determining whether a suspension bearing temperature has exceeded a predetermined limit wherein the suspension bearings are located on a plurality of different rolling stock.

It is a further object of the present invention to provide a traction motor control system which generates an audible alarm and visual warning indicative of an overheating condition relating to the suspension bearings of the traction motor.

It is also an object of the present invention to provide a traction motor control system capable of distinguishing between traction motor suspension bearing overheating on a plurality of locomotives such that the operator is notified as to whether suspension bearing overheating is occurring on the locomotive for which he is controlling, or other trailing locomotive.

It is a further object of the present invention to provide a traction motor control system capable of determining a stretch braking condition and automatically limiting traction motor current when an operator applies power braking for an extended period of time.

It is a further object of the present invention to provide a traction motor control system capable of detecting a stretch braking condition and providing a visual and audible warning in indicative that the stretch braking condition has extended beyond the acceptable period of time.

A locomotive traction motor control system includes a traction motor suspended by traction motor suspension bearings, such as roller bearings in a bearing assembly, and traction motor suspension bearing temperature sensors, such as thermistors, for sensing a temperature of the traction motor suspension bearings. A controller, such as a microprocessor based controller, receives a hot bearing indication from a hot bearing detection unit (HBDU) connected to the suspension bearing temperature sensors. The controller generates a warning indication based on the temperature sensed by the suspension bearing temperature sensors when the HBDU detects an improper bearing temperature.

The suspension bearing temperature sensors are operatively mounted in a traction motor suspension bearing housing and externally from the traction motor bearing assembly. The traction motor control system also includes audible sound generating means, responsive to the controller, for generating an audible warning indication that a hot suspension bearing condition has been detected.

The control system may be part of a multi-locomotive traction motor suspension bearing monitoring system having a plurality of traction motor suspension bearing temperature detection units operatively coupled via a communication link to the controller. The controller generates a visual warning indicating whether a suspension bearing overheating condition exists on a subject locomotive or another locomotive in a consist. The traction motor control system is compatible with conventional axle bearing temperature detection systems used on passenger cars.

In another aspect of the invention, the traction motor control system facilitates detection and warning of an improper stretch braking condition and subsequently takes positive action to protect the traction motors. The control system includes a brake detector coupled to the controller for detecting application of a locomotive braking mechanism. A speed sensor monitors the speed of the locomotive. The controller is responsive to a power request signal and determines whether a stretch braking condition exists for a predetermined period based upon input from the brake detector, the speed sensor and upon the power request signal. When a stretch braking condition occurs for too long of a period, the controller limits the current to the traction motor. The controller outputs a warning message to the visual display indicating that an improper stretch braking condition has been detected.

A method for controlling a locomotive traction motor includes determining whether a brake is applied, determining whether power is requested for the locomotive, waiting a predetermined period of time after power is requested and after the brake is applied, and limiting an amount of current supplied to the traction motor after waiting the predetermined period of time. The method may further include the steps of limiting fuel to the engine to limit maximum engine power output in response to detecting an improper stretch braking condition; and displaying a warning message on a display means indicating that the improper stretch braking condition has been detected.

BRIEF DESCRIPTION OF THE DRAWINGS

FIG. 3B is a cross-sectional view taken along lines 3B—3B;

FIG. 3C is a close up view of a traction motor suspension bearing temperature sensor positioned in the suspension bearing housing in accordance with the invention;

FIGS. 5A and 5B depict a flow chart generally illustrating a method for detecting and warning an operator of an undesirable stretch braking condition in accordance with the invention.

DESCRIPTION OF THE PREFERRED EMBODIMENTS

Figure 1:
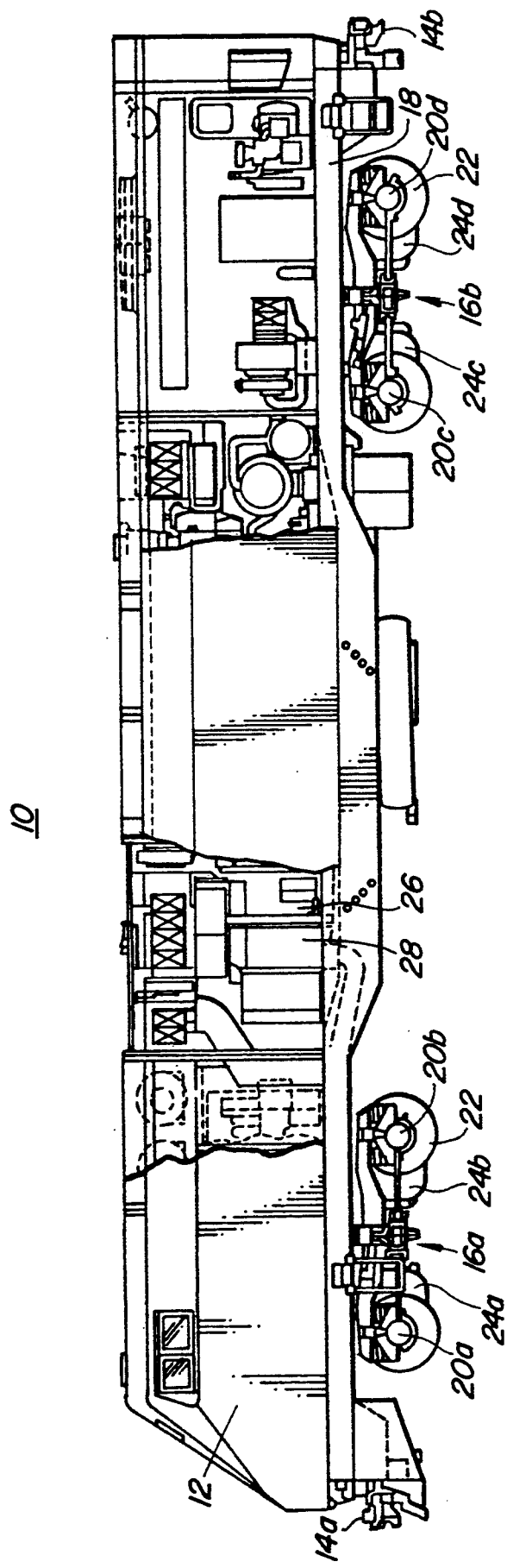
FIG. 1 depicts a partial cut away perspective view of a monocoque-type locomotive adapted with a traction motor control system in accordance with the invention.

FIG. 1 illustrates a passenger monocoque-type locomotive 10 powered by a diesel engine. The monocoque locomotive 10 has a cab 12 in the front which serves as the driving station for an operator. Couplers 14a and 14b are located at each end of the locomotive 10 and serve to allow coupling to other rolling stock such as additional locomotives (not shown) and/or passenger cars (not shown). The monocoque locomotive 10 has a plurality of trucks generally indicated at 16a and 16b which are coupled to a platform 18 through a suitable suspension arrangement. Each of the plurality of trucks 16a and 16b have two axles 20a, 20b, and 20c and 20d, respectively, which are fixedly connected to respective wheels 22. Each axle 20a–20d is propelled by a corresponding traction motor 24a–24d respectively.

The diesel engine drives a traction alternator 26 which supplies current to the traction motors 24a–24d, such as direct current (D.C.) to D.C. traction motors. A governor (not shown), under control of a controller, regulates the amount of fuel supplied to the engine. However, any suitable fuel control system may be employed, including fuel injection control systems. An auxiliary alternator 28 serves to supply current to auxiliary devices of the locomotive such as air-conditioners and other equipment.

Figure 2:
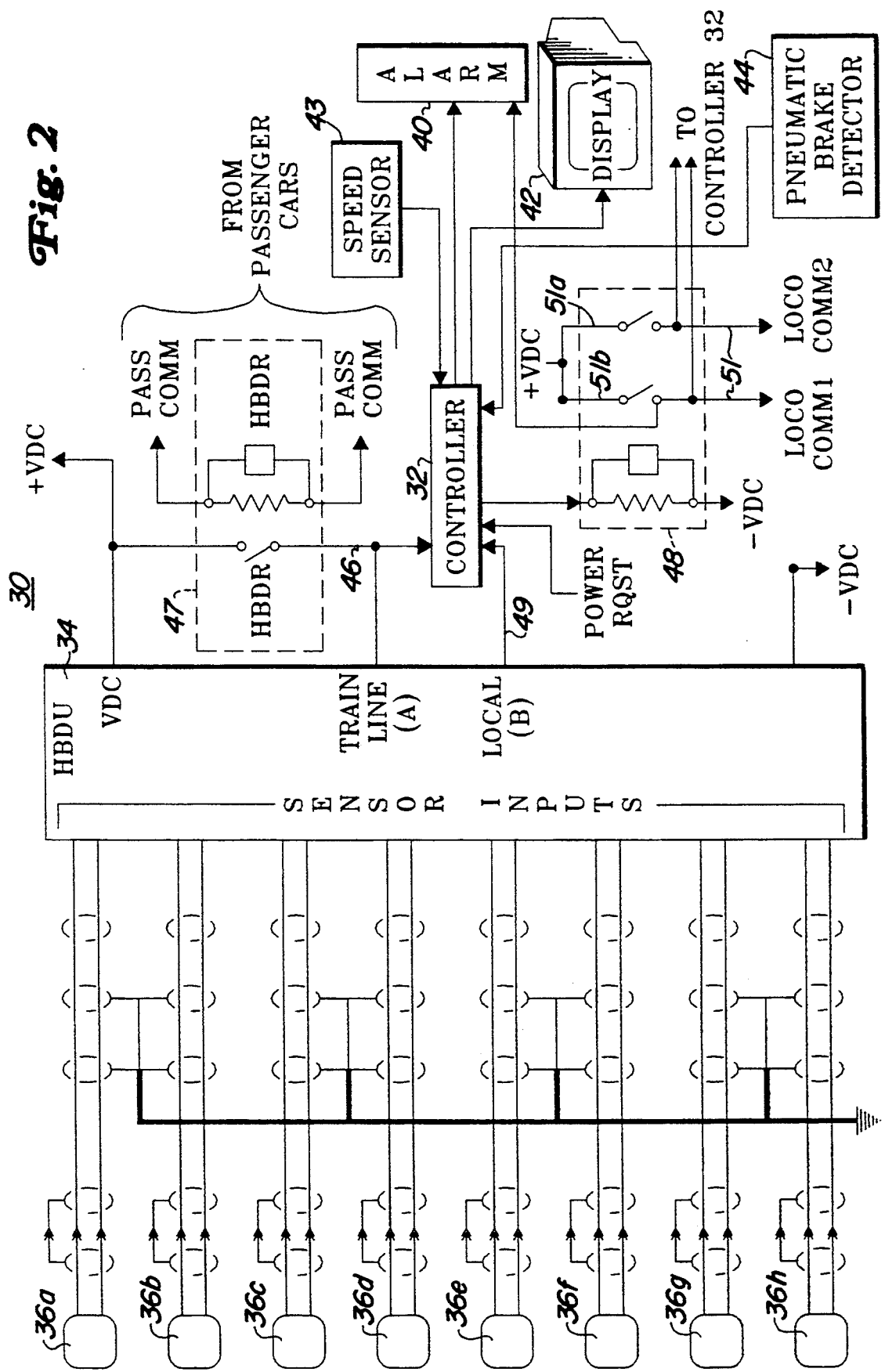
FIG. 2 is a block schematic diagram of a traction motor control system in accordance with the invention.

FIG. 2 illustrates a block diagram of the inventive traction motor control system 30 which includes a locomotive computer system having a controller 32 coupled to a hot bearing detection unit 34. The hot bearing detection unit 34 receives signals output from traction motor suspension bearing temperature sensors 36a–36h. Two traction motor suspension bearing temperature sensors are used for each axle. Sensors 36a and 36b correspond to a suspension bearing temperature sensor on the left and right wheels of axle 28a, suspension hot bearing sensors 36c and 36d correspond to left and right sensors for axle 20b, suspension bearing sensors 36e and 36f correspond to left and right sensors for axle 20c, and suspension hot bearing sensors 36g and 36h correspond to left and right sensors for axle 20d. A suitable hot bearing detection unit with corresponding traction motor suspension bearing temperature sensors may be a kit such as a model no. 200101-15-001, obtainable from Servo Corporation of America, Hicksville, N.Y. However, any suitable controller and temperature sensing devices may also be used. The hot bearing detection unit 34 also includes light emitting diodes (LED) (not shown) to indicate that a sensor has detected an overheating condition. The LEDs indicate left and right faults so that the operator can determine the location of the defective bearing.

The controller 32 is coupled to an audible alarm 40, such as an electronically activated bell, which may be heard by an operator of the locomotive. The controller 32 is also coupled to a console display 42 which outputs visually readable messages for the operator. The visually readable messages are warning messages stored in a memory device accessible by the controller 32. The controller 32 is also coupled to a speed sensing mechanism 43 and a pneumatic power brake detector 44 which detects the activation of the pneumatic brake such as a pressure sensor in the brake air line. The speed sensing mechanism 43 may be any suitable speed sensing configuration for monitoring the speed of the locomotive either directly or indirectly (e.g. through software calculations based on fuel consumption and load information). The controller 32 also receives a power request indication such as a power notch selection input signal (or signals) or throttle information in the form of a throttle request input signal (POWER RQST).

In a conventional train system, locomotive and passenger car power systems are isolated. Hence ground differentials may occurs between locomotives and passenger cars. Train lines, referred to herein, are lines that are externally accessible by other rolling stock (passenger cars, and locomotives) whereas local lines are lines that are internal to a given passenger car or locomotive and not accessible by other rolling stock. Passenger cars have differential-type communication links PASS COMM (two wire twisted-pair lines) common between passenger cars and locomotives have separate differential-type communication links LOCO COMM1 and LOCO COMM2 such as a signal trainline SIG TL 51b and an axle warning trainline AXLE TL 51a respectively between locomotives in the consist. Relays are used to couple the isolated passenger car communication links to the locomotive communication links.

The hot bearing detection unit 34 couples to a train line, generally indicated at 46, which serves as a communication link connected to the hot bearing detection unit of the current locomotive. The train line 46 may also be activated by a passenger car communication link PASS COMM through a relay 47. Each passenger car may have a hot bearing detection unit adapted to detect hot axle bearings as known in the art. The hot bearing detection relay 47 activates the train line 46 (pulls the train line "HIGH") when a hot axle bearing condition is detected in a passenger car.

A relay 48, under the control of the controller 32, allows the controller to activate the axle warning train line AXLE TL 51a and SIG TL 51b to activate a console light and an alarm in response to detected locomotive related faults. Each locomotive has a hot suspension bearing detection unit 34 to detect traction motor suspension bearing temperature in accordance with the invention.

In operation, the hot bearing detection unit 34 monitors the traction motor suspension bearings for the traction motors of the current locomotive while each passenger car includes a hot axle bearing detection unit similar is design to the HBDU 34. When the hot axle bearing detection unit detects a hot axle bearing, the train line is activated to indicate an axle bearing fault for one of the passenger cars. Each of the other locomotives in the consist have secondary hot suspension bearing detection units, of the same design as the HBDU 34, to also detect hot traction motor suspension bearings for each of the traction motors on each of the secondary locomotives. The secondary hot suspension bearing detection units activate the AXLE TL 51a and SIG TL 51b to indicate that a respective suspension bearing failure condition exists.

The hot bearing detection unit 34 outputs both a train line signal (A) 46 and a local signal (B) 49 to the controller 32 to indicate that a traction motor suspension bearing temperature sensor has detected a suspension bearing overheating condition. The HBDU 34 also utilizes a self test mode and outputs a self test failure signal also as a local signal (B) 49 to notify the controller when the HBDU is faulty.

Figure 3A:
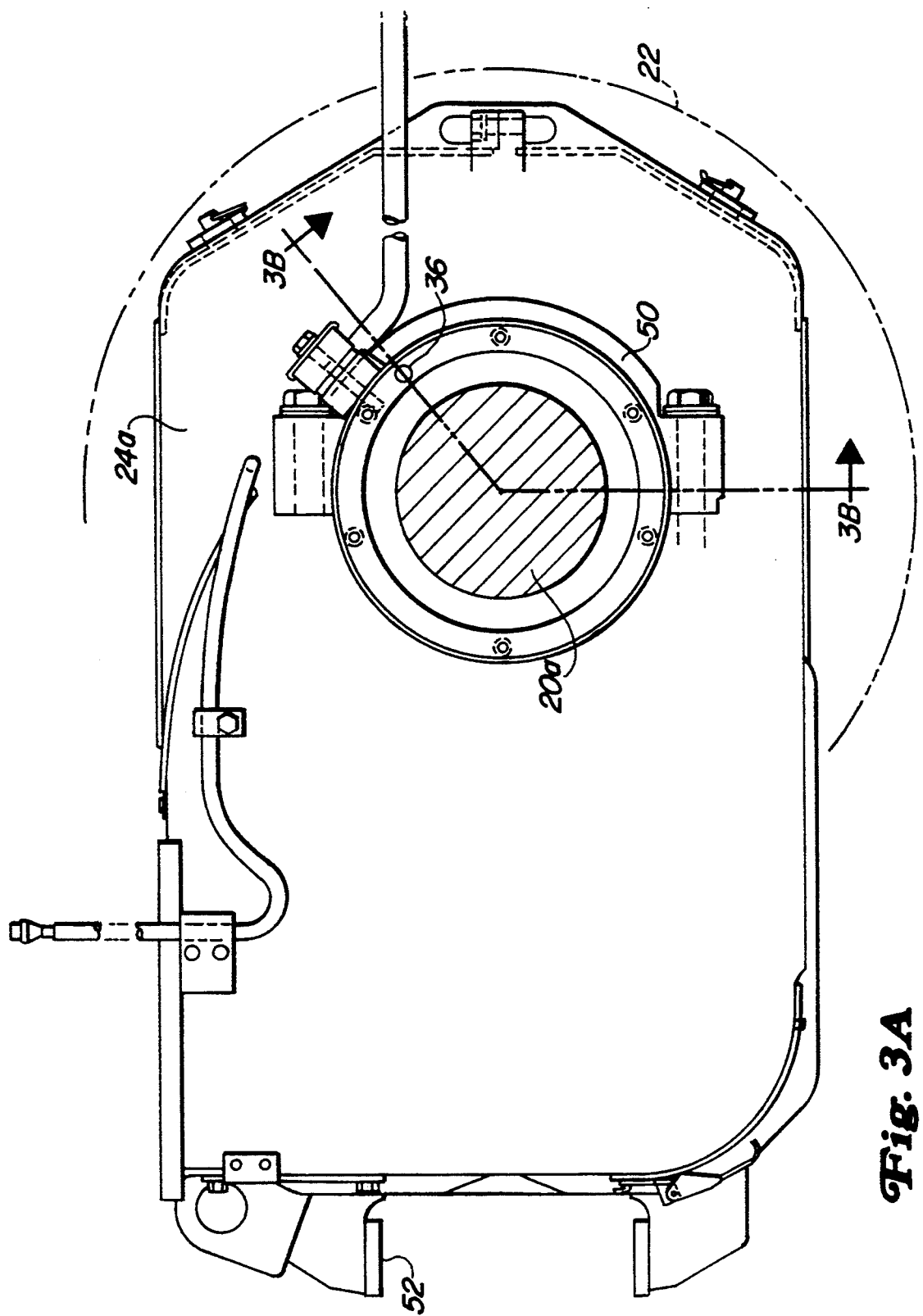
FIG. 3A is a side view of an axle mounted traction motor having a traction motor suspension bearing temperature sensor positioned in the suspension bearing housing in accordance with the invention.

FIGS. 3A and 3B illustrate the location of the traction motor suspension bearing temperature sensors 36a and 36b for the traction motor 24a. The traction motor 24a is mounted to axle 20a through "U" Tube 50 and has an end 52 adapted to connect to the truck 16a. The end 52 may be suitably mounted to the truck 16a as known in the art. The suspension bearing temperature sensors are mounted above the horizontal center line of the axle 20a as shown. It has been found that the location of the suspension bearing temperature sensors 36a and 36b is important so as to avoid damage by foreign debris that may be lying between railroad tracks.

Referring to FIG. 3B, suspension bearing temperature sensors 36a and 36b are positioned in the bearing housing 50 in a substantially parallel orientation with respect to the axle. As previously mentioned, the suspension bearing assembly includes an angled roller bearing 56 interposed between a cup 58 and a cone 60. A suspension bearing cap 61 and insert 63 hold the suspension bearing assembly in a fixed position. Suspension bearing temperature sensor 36a is located at the drive end of the DC traction motor 26a proximate the drive gear 62 which is rotationally driven by a pinion gear connected to the drive shaft of the traction motor as known in the art. Suspension bearing temperature sensor 36b is located at the plain end of the traction motor. The suspension bearing sensors 36a and 36b have tips located proximate to the roller bearing 56 but do not extend into the bearing assembly components. Therefore, the lubricant temperature is not directly measured by the sensors 36a and 36b. One advantage of this location is that the lubricant is not contaminated by a bearing sensor. Furthermore, replacement of these sensors will not cause contaminates such as dirt or the like to enter the lubrication chamber of the bearing. In addition since the stress points surrounding the roller bearing assembly may endure a substantial amount of stress, the sensor is located external to the roller bearing so as not to be submitted to such stresses.

FIG. 3C shows the sensors 36a and 36b screwably engaged into a bore 66 located in the bearing housing 50 parallel to the axle. The sensor has an elongated section 67 with a temperature sensing end 68. The elongated section 67 facilitates proximate location to the roller bearing 56. Each sensor 36a and 36b supplies a signal to the hot bearing detection unit 34 to indicate the temperature sensed proximate the suspension bearing assembly.

Figure 4A:
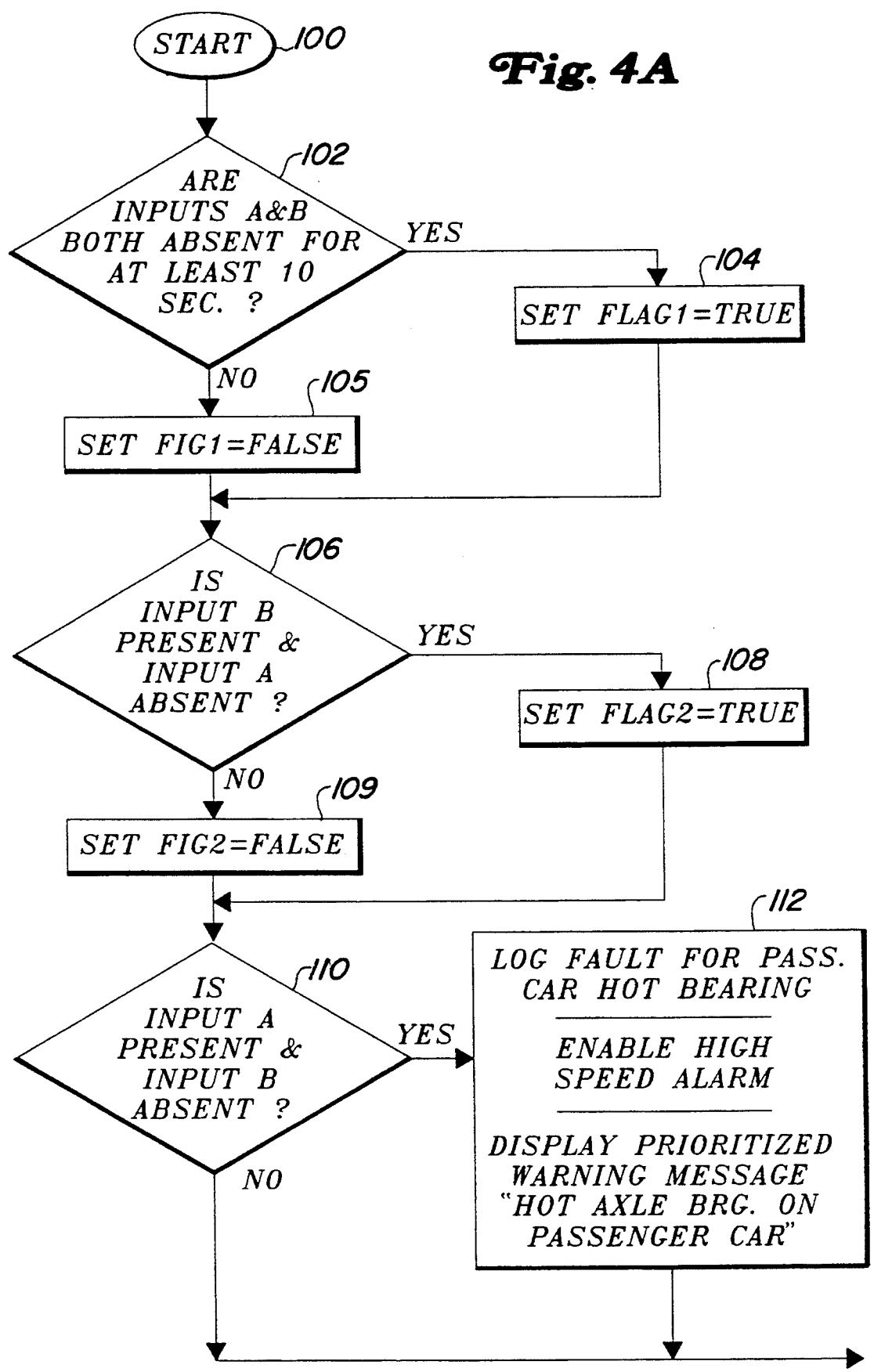
FIGS. 4A–4C show a flow chart generally illustrating a method for detecting and warning an operator of a hot traction motor suspension bearing in accordance with the invention.
Figure 4B:
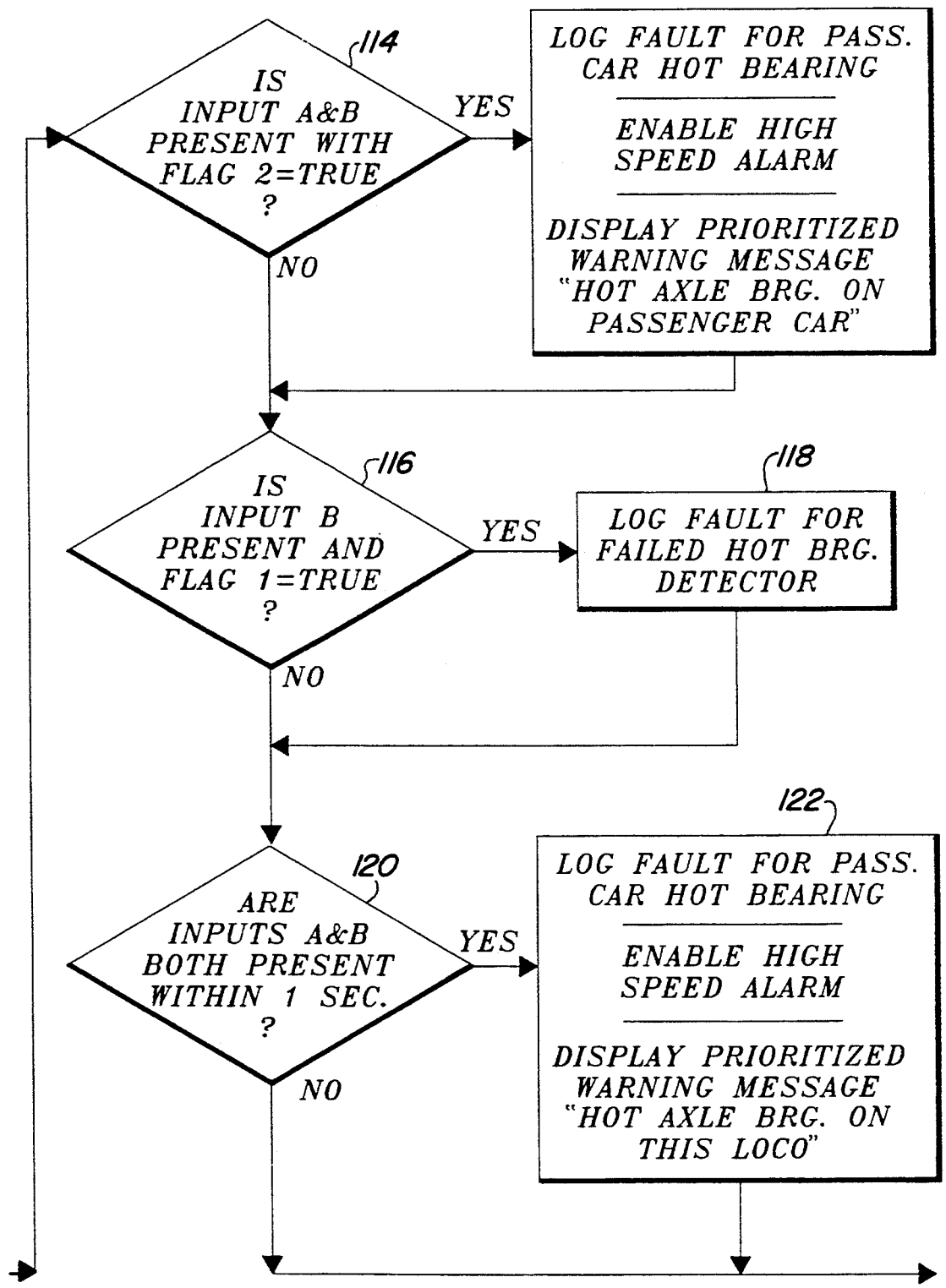
Figure 4C:
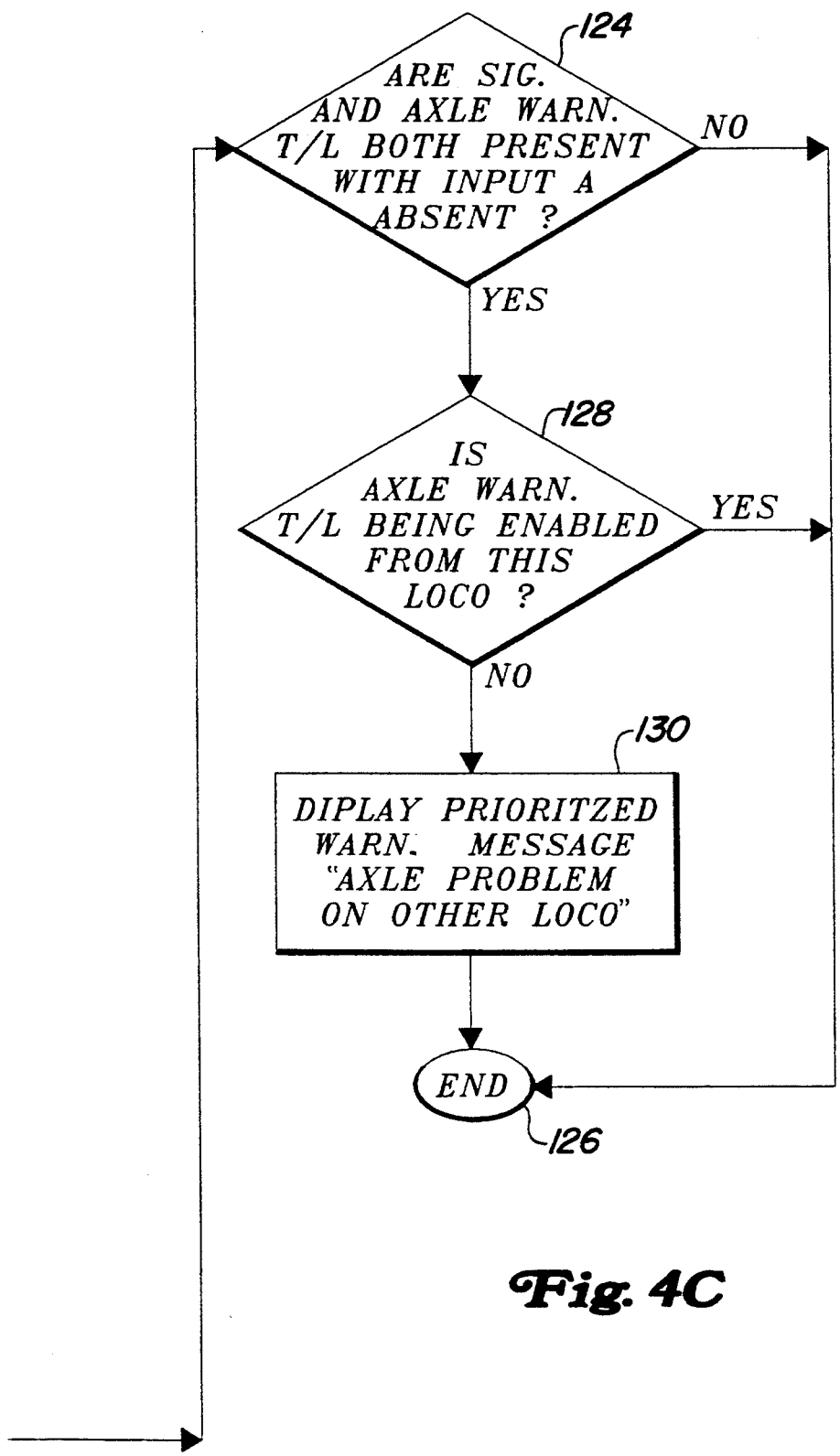

FIG. 4 illustrates a method of traction motor control which utilizes the traction motor suspension bearing sensors. The controller 32 carries out the method via software execution. As shown in FIG. 4, input (A) refers to a train line signal caused by either a passenger car axle bearing detector or from the hot bearing detection unit 34 from the current locomotive. Input (B) 49 refers to a signal from the hot bearing detection unit 34 of the current locomotive indicating that the HBDU is experiencing a fault or in conjunction with Input (A), to indicate a hot suspension bearing condition. The controller waits for a period of at least five seconds to determine whether inputs A 46 and B 49 are present before taking action. The signal train line 51b and the axle warning train line 51a are features of conventional locomotives. The controller 32 monitors the signal trainline 51b and the axle warning line 51a to determine whether either are activated.

The signal train line 51b is a communication link which when pulled "HIGH", activates an audible alarm 40 used to 16 the operator of a potential problem of any nature in any of the locomotives. Activation of the AXLE TL 51a provides a visual indication by illuminating a light source (not shown), located on the operator's console, to inform the operator that an abnormal axle condition is present in at least one of the locomotives. A high speed alarm condition causes the controller 30 to activate both the signal train line 51b and axle warning train line 51a if the locomotive speed is above a predetermined speed, such as ten miles an hour, during a hot bearing condition.

The process starts at block 100 by the controller determining that a hot bearing detection option bit has been set to enable the operation for the following process. Next, the controller 32 determines whether the train line input or the local input are absent for a predetermined amount of time such as ten seconds as indicated in block 102. This time period serves as a type of settling time to insure that a signal level (HIGH or LOW) to the controller occurs for a suitable period of time.

Referring again to block 102, the controller performs a system error check to insure that no fault condition currently exists. Therefore, if both the train line input (A) 46 and the local input (B) 49 to the controller are absent (not at a proper voltage level) for at least 10 seconds, the controller sets a FLAG1 in a register indicating that no faults exist. However, if both inputs (A) and (B) are not absent for at least 10 seconds, the controller sets FLAG1 indicating that a fault exists, as shown in block 105. The purpose of FLAG1 will be described later with reference to block 116.

The controller determines whether the local input (B) is present and whether the train line input (A) is absent as shown in block 106. If the local input (B) is present and if the trainline (A) has not been activated, the controller will set FLAG2 to indicate this condition (TRUE), as shown in step 108. However, if input (B) is absent, FLAG2 is set to indicate this condition (FALSE), as shown in block 109. The FLAG2 is used to distinguish the difference between a locomotive hot suspension bearing condition and an HBDU 34 failure which is followed by a passenger car hot axle bearing condition.

The controller determines whether the train line has been activated and determines whether the local input is absent to detect a passenger car hot axle bearing condition, as shown in block 110. If the train line is activated indicating a hot bearing detection or other failure, and if the local input is absent, the controller will log a fault indicative that an axle bearing detection unit from a passenger car has detected a hot axle bearing, as shown block 112. The controller will also enable a high speed alarm by activating relay 48 and causing a prioritized warning message such as "Hot axle bearing on passenger car" to be displayed on the display 42 to inform the operator that a passenger car has a faulty axle bearing.

If the answer to the decision in block 110 is no, or if the alarm has been activated and the priority message has been displayed, the controller determines whether the train line input and local input are present with FLAG2 being true as shown in block 114. This detects a passenger hot axle bearing condition if there was a pre-existing HBDU failure for the HBDU on the current locomotive.

If the response to block 114 is yes, the controller will log a fault indicating that an axle bearing for a passenger car is hot and will enable the high speed alarm. The controller also displays a priority warning message as described with respect to block 112. This activity occurs since the local input (B) was activated without a corresponding train line activation thereby indicating that the HBDU 34 may have failed the self test.

However, if the answer to block 114 is no, the controller will determine whether the local input is present and whether FLAG1 is set to be true as shown in block 116. If the answer to block to 116 is yes, the controller will log a fault in memory indicating that the HBDU 34 on the current locomotive is faulty and has failed the self test as shown in block 118.

In block 120, the controller determines whether the train line input and the local input are both present within a predetermined period of time, such as one second. Such an occurrence indicates that the HBDU 34 detects a hot suspension bearing in the current locomotive. Hence, if the answer is yes, the controller will log a fault indicating a hot suspension bearing failure for the current locomotive and enable the high speed alarm. The controller will display a prioritized message on the display 42 to indicate a hot axle bearing failure has occurred, as shown in block 122.

If the answer to block 120 is no, the controller determines whether the signal trainline 51b and axle warning train line 51a are both present with the input (A) absent as shown in block 124. This is done to determine if an axle warning condition exists with the absence of a hot bearing (either axle bearing or suspension bearing) indication in either the passenger cars or the current locomotive.

If the answer to block 124 is no, the controller ends the hot bearing detection process as shown by block 126. If the answer to block 124 is yes, the controller then determines whether the axle warning train line is being enabled from the current locomotive as shown in block 128. If the answer is yes, the controller will end the hot bearing detection process. If the answer to block 128 is no, the controller will display the prioritized warning message "Axle problem on other locomotive" to indicate that the HBDU of another locomotive has activated the axle warning train line to indicate that the suspension bearing of another locomotive may be overheated, as shown in block 130. Block 128 in conjunction with block 124 determine that another locomotive in the consist has a potential hot suspension bearing.

Therefore, the traction motor control system 30 detects overheating traction motor suspension bearings and distinguishes between locomotives to notify the operator whether the overheating condition is occurring on the subject locomotive or on another locomotive in the consist. In addition, the traction motor control system 30 generates an audible alarm and visual warning indicative of an overheating condition relating to the suspension bearings of traction motors.

Figure 5A:
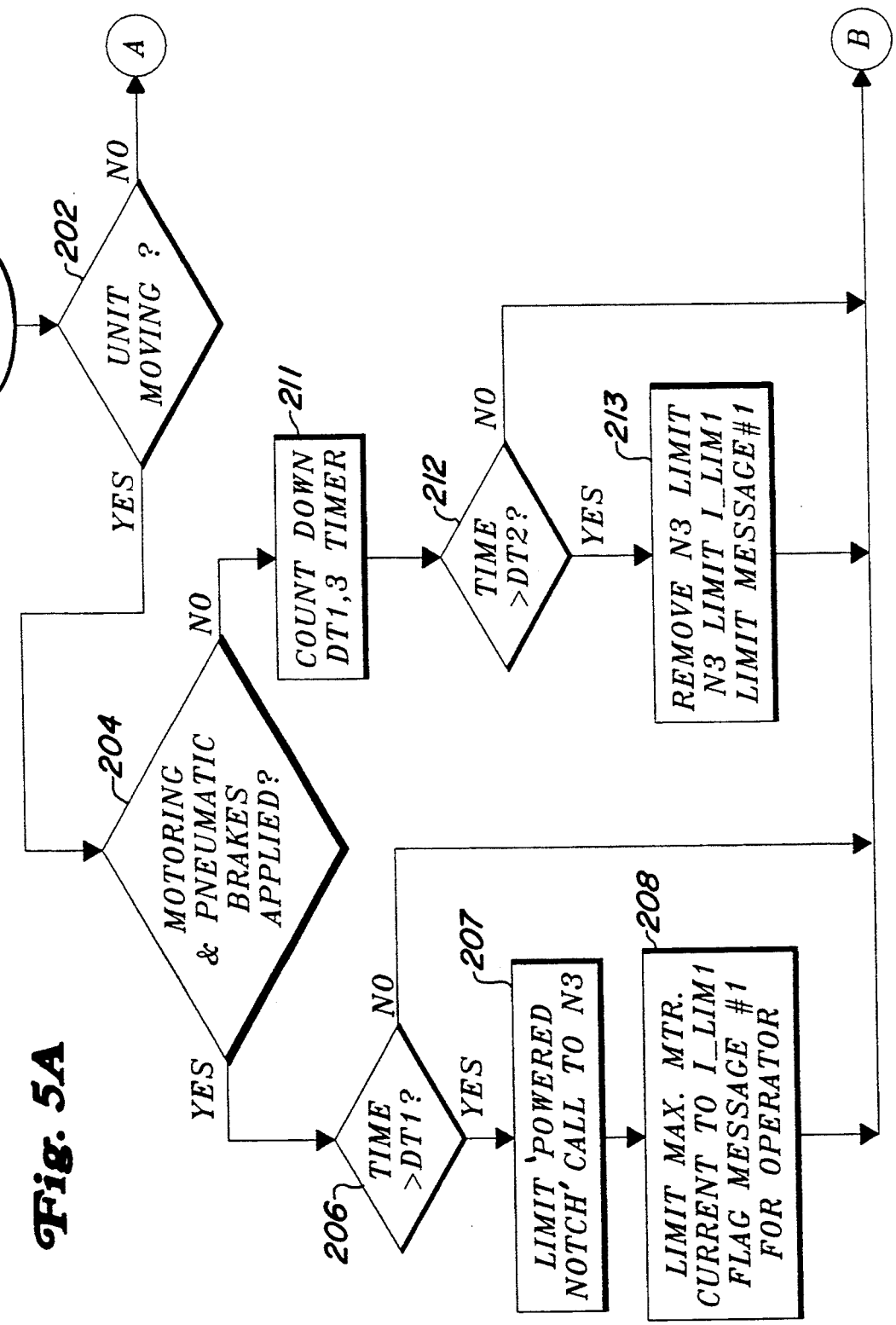

FIGS. 5A and 5B illustrate a traction motor control method to determine an inappropriate stretch braking condition. The controller determines whether a stretch braking condition exists and then takes appropriate action depending upon the time period over which the stretch braking occurs. The controller limits the current to the traction motor and generates a warning indication for the operator in response to detecting the inappropriate stretch braking condition. The controller also limits the amount of power that can be requested from the engine in response to detecting the inappropriate stretch braking condition.

The traction motor control method for controlling stretch braking starts at block 200. Referring also to FIG. 2, the controller determines whether the locomotive is moving, as shown in block 202, by obtaining the locomotive speed from the vehicle speed sensing mechanism 43, such as a reluctance sensor and tooth combination for sensing the rotation of the drive shaft of the traction motor, as known in the art. If the locomotive is moving, the controller determines whether the locomotive is motoring with the pneumatic brake applied as shown in block 204 by detecting whether the brake detector AA indicates a braking condition. Motoring is determined by monitoring the power request signal (POWER RQST) to determine the level of engine power output requested by the operator. It will be recognized that any suitable power request information may serve as the power request input signal. The controller 32 determines whether the pneumatic brakes are applied based upon the amount of pressure in the brake line. For example, the brake sensor may be a pressure transducer for outputting an analog signal representing the amount of pressure in the brake line.

If the locomotive is motoring and the pneumatic brakes are applied, the controller determines whether an allowable stretch braking delay period (DT1) has elapsed, such as ten seconds as shown in block 206. A software up/down counter serves as the DT1 timing mechanism. The delay period corresponds to the maximum duration allowed for stretch braking. For example, if 10 seconds of stretch braking has elapsed, the controller detects an improper stretch braking condition. Therefore, the controller is responsive to a power request signal and determines whether a stretch braking condition exists for a predetermined period based upon input from the brake detector, the speed sensing mechanism and upon the power request signal.

If the elapsed time is greater than the first period (DT1) of block 206, the controller determines that the power should be limited to a predetermined power output level, such as a notch 3 level as shown block 207. The controller overrides the power request from the operator and limits engine speed by directing the governor to reduce fuel to facilitate a notch 3 level. After the controller indicates that the power should be limited to a particular power level (locomotives typically have eight selectable notches wherein each notch represents a different power level), the controller also limits the maximum current to the traction motor as indicated in block 208. The controller, through a voltage control mechanism as known in the art, limits the voltage from the alternator to limit the alternator field current thereby reducing the current available to the traction motor. For example, the current may be limited to 400 amps. Hence, the controller facilitates limiting of current to the traction motor when the predetermined period exceeds a predetermined threshold, such as after the allowable stretch braking period has elapsed.

Also as indicated in block 208, the controller displays a prioritized warning message via the display 42 to notify the operator that a load limit has been reached since too much power braking has occurred while motoring. The warning messages displayed by the traction motor control system 30 on the display unit 42 are prioritized such that their display will override the standard display messages which occur during normal operation of the locomotive. The controller will then continue to monitor whether or not the stretch brake condition is occurring as indicated in block 210.

Referring back to block 204, if the controller determines that motoring is not concurrently occurring with the brakes being applied, the controller effectively zeros out timers DT1 and DT3 by counting down the DT1 (10 seconds) timer and software up/down timer DT3 (20 seconds) as shown in block 211. The DT3 time period corresponds to another allowable stretch braking period as will be described later. It will be understood that the controller will stop the count down process of block 211 if a stretch braking condition (while the locomotive is moving) occurs in the interim.

As shown in block 212, the controller then determines whether or not the time of non-concurrent motoring and braking conditions is greater than a predetermined time period DT2 (approximately two seconds). If the time is greater than DT2, the controller removes the notch 3 power limit restriction and the warning message as shown in block 213. For example, if an improper stretch braking condition had been detected and the operator subsequently removes the brake for at least the DT2 time period, the controller removes the operating restrictions and gives complete control of the locomotive back to the operator. The controller continues to monitor the locomotive to determine whether a stretch braking condition exists as indicated by block 210.

Referring back to block 202, if the unit is not moving, the controller determines whether stretch braking is occurring during a test mode (an external load box connected when the engine is tested for maintenance purposes) or other condition when the locomotive is at a stand still as indicated in block 214. For example, the locomotive may be stopped on a hill and power may be requested while the brakes are applied to prevent the locomotive from going down the hill. If there is no external load box, the controller, as shown in block 216 determines whether stretch braking has occurred for more than the allowable stretch braking time out period DT3 (approximately 20 seconds). The time out period DT3 is longer than the time out period DT1 to allow a longer stretch braking period so that the locomotive may obtain a sufficient speed when it is starting from a stop on a hill.

If the time has exceeded the DT3 20 second time out period, the controller limits the power notch to a notch 3 level and limits the maximum traction motor current to approximately 400 amps, in a similar manner as described with reference to block 208. The controller also causes a warning message to be displayed for the operator indicating that a load limit has been reach and that too much power braking has occurred. The controller then waits another time period DT4 and determines whether or not that period has elapsed as shown in block 220. The time period DT4 serves as an additional time period before the controller overrides the operator power request to prevent the excessive degradation caused by too much stretch braking.

As shown in block 222, if the improper stretch braking condition lasts for more than the time period DT4, the controller overrides the motoring request by the operator and removes the message from the display 42. The controller causes another priority warning message to be displayed for the operator to move the throttle to an idle position as shown in block 222. The controller then continues to monitor the locomotive as shown in block 210.

Referring back to block 214 if the external load box is connected, the controller "zeros" DT1 and DT3 by counting down each respective timer, similar to the operation described with reference to block 211. In a like manner as in blocks 212 and 213, the controller in blocks 226 and 228 determines whether a time out period DT6 (2 second period) has elapsed and removes the notch 3 power restriction, the traction motor current limit and the warning message from the display as shown in block 228 when the two seconds has elapsed. The controller then returns to continue monitoring for an improper stretch braking condition.

Based on the foregoing, the control system determines whether a brake is applied; determines whether power is requested for the locomotive; waits a predetermined period of time after power is requested and after the brake is applied; and limits an amount of current supplied to the traction motor after waiting the predetermined period of time. The control system 30 also limits fuel to the engine to limit engine power output in response to detecting an improper stretch braking condition.

The traction motor control system as described above includes traction motor suspension sensors which measure the temperature proximate to the suspension bearings to warn the operator of an overheating condition. The system 30 also facilitates detection and warning for an undesirable stretch brake condition wherein an extended stretch braking condition will be detected and the operator subsequently notified. The operator may release the brake or eliminate the power request (move notch to idle) to remedy the failure.

Also according to the foregoing description, the traction motor control system 30 facilitates the execution of both methods disclosed with respect to FIGS. 4 and 5. Hence a traction motor control system is disclosed which is capable of determining whether a suspension bearing temperature has exceeded a predetermined limit wherein the suspension bearings are located on a plurality of different locomotives. The traction motor control system 30 generates an audible alarm and visual warning indicative of an overheating condition relating to the suspension bearings of the traction motor. The control system 30 detects a stretch braking condition and provides a visual and audible warning indicative that the stretch braking condition has extended beyond the acceptable period of time.

Specific embodiments of novel methods and apparatus of a traction motor control system have been described for the purposes of illustrating the manner in which the invention may be used and made. It should be understood that the implementation of other variations and modifications of the invention, in its various aspects, will be apparent to those of ordinary skill in the art, in that the invention is not limited by the specific embodiments described. It is therefore contemplated to cover by the present invention any and all modifications, variations, or equivalents that fall within the true spirit and scope of the basic underlying principals disclosed and claimed herein.

What is claimed is:

1. A locomotive traction motor control system, comprising:

a traction motor operatively suspended by traction motor suspension bearing means;

sensing means for sensing a temperature of the traction motor suspension bearing means, the sensing means being operatively mounted in a traction motor suspension bearing housing located externally from a traction motor bearing assembly; and control means, responsive to the sensing means, for generating a visual and audible warning indication based on the temperature sensed by the sensing means, the control means including a controller and a plurality of traction motor suspension bearing temperature detection units operatively coupled via a communication link to the controller, each unit being adapted for sensing the temperature of traction motor suspension bearings on different locomotives wherein the controller generates a visual warning indication whether a suspension bearing overheating condition exists on the locomotive or another locomotive in a consist.

2. The control system of claim 1 wherein the traction motor suspension bearing temperature sensing means is comprised of a thermistor.

3. The control system of claim 1 further comprising audible sound generating means, responsive to the control means, for generating the audible warning indication.

4. The control system of claim 3 further comprising visual display means, responsive to the control means, for displaying a traction motor suspension bearing temperature detection message as the visual warning indication.

5. The control system of claim 1 further comprising:

brake detector means, operatively coupled to the control means, for detecting application of a locomotive braking mechanism;

speed sensing means, operatively coupled to the control means, for monitoring the speed of the locomotive; and the control means being responsive to a power request signal wherein the control means determines whether a stretch braking condition exists for a predetermined period based upon input from the brake detector means, the speed sensing means and upon the power request signal and facilitates limiting of current to the traction motor when the predetermined period exceeds a predetermined threshold.

* * * * *